(No Model.)
H. G. MACKINNEY.
JOINT FOR JEWELRY PINS.
No. 273,564.  Patented Mar. 6, 1883.
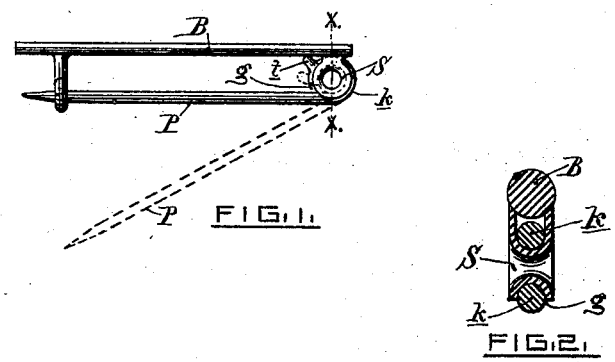
WITNESSES.
INVENTOR.
Herbert G. Mackinney

UNITED STATES PATENT OFFICE.

HERBERT G. MACKINNEY, OF PROVIDENCE, RHODE ISLAND.

JOINT FOR JEWELRY-PINS.

SPECIFICATION forming part of Letters Patent No. 273,564, dated March 6, 1883.

Application filed December 7, 1882. (No model.)

*To all whom it may concern:*

Be it known that I, HERBERT G. MACKINNEY, of the city and county of Providence, and State of Rhode Island, have invented certain Improvements in Joints for Jewelry-Pins and similar articles, of which the following is a specification.

The object of my invention is a joint or hinge which shall occupy but little space laterally, and consequently be adapted to a narrow bar or tail piece, and at the same time be strong and durable.

In the accompanying drawings, Figure 1 is a view of a jewelry-pin or brooch provided with my improved joint, the joint being shown in side elevation. The broken lines show the pin open. Fig. 2 is a transverse section on line $x$ $x$ of Fig. 1, much enlarged.

B is the bar or front, and P is the tongue or pin joined or hinged thereto. This joint is formed by soldering to the bar the circular sheave-like standard or support S, the groove $g$ of this support being wide enough to receive the shank $k$ of the pin P, which is simply bent around the support and lies in the said groove and turns therein as the pin is opened or closed.

It will be observed that this is a very simple and compact joint, that it is composed of very few parts, and that it is peculiarly adapted to a narrow brooch or bar.

A stop, $t$, to cause the tongue to spring when engaging the outer catch, $c$, may be provided, as shown, to move with the tongue and strike against the opposite bar; or a stationary stop may be provided, against which the tongue will strike in closing.

The joint for pins of the kind referred to has commonly been formed by the use of a pivot or journal pin, which serves as the axis and holds the parts together. This axial pin is very liable to become loose and require repair or even cause the loss of the brooch by the wearer. As by my invention the tongue is itself attached directly to a permanent part of the brooch, this axial pin is dispensed with altogether.

What I claim, and desire to secure by Letters Patent, is—

1. A joint or hinge for a jewelry-pin and similar articles, composed of the standard S, having a grooved periphery, as described, and a bent portion of the tongue or pin encircling said periphery and occupying said groove, and adapted to turn therein to allow the pin to be opened and closed, as and for the purpose specified.

2. In a jewelry-pin and similar articles, the combination, with the bar B and grooved standard S, of the tongue or pin P, having the rear end thereof bent around said standard and occupying said groove, whereby a joint or hinge is formed, substantially as described, and for the purpose specified.

HERBERT G. MACKINNEY.

Witnesses:
STEPHEN W. NICKERSON,
WELCOME A. GREENE.